ELECTROSTATIC MEMORY SYSTEM

Filed June 1, 1953 2 Sheets-Sheet 1

INVENTOR
Robert W. Schumann
BY
Roland A. Anderson
ATTORNEY

INVENTOR
Robert W. Schumann
BY
Roland A. Anderson
ATTORNEY

United States Patent Office 2,790,931

Patented Apr. 30, 1957

2,790,931

ELECTROSTATIC MEMORY SYSTEM

Robert W. Schumann, St. Paul, Minn., assignor to the United States of America as represented by the United States Atomic Energy Commission Application June 1, 1953, Serial No. 358,895

3 Claims. (Cl. 315—22)

The present invention relates to an improved electrostatic memory system, and more especially to a novel arrangement for storing and reproducing information from cathode ray tubes which form the storage elements of the electrostatic memory.

In the Williams electrostatic memory system, binary numbers are "stored" at a point on the surface of a cathode ray tube phosphor by causing one of two alternative charge patterns to appear at the point, depending upon whether binary "1" or "0" is to be stored. See "Proc. Inst. Elec. Eng." 96, 3, pp. 81–100. One possible charge pattern at a given point may be represented by a potential well similar to that shown in Fig. 7 of the publication and in the left waveform of Fig. 1 herein. When it is desired to inspect such a well, the cathode ray tube beam is directed at the point and momentarily intensified. A pickup plate adjacent the tube face receives an induced negative signal as the beam strikes the screen, followed by a smaller positive signal as the beam is cut off and the cloud of electrons leaves the vicinity of the spot. The right waveform of Fig. 1 herein shows a partially refilled well, which may be formed by directing the beam to a point separated from the normal spot by a distance from 1 to 1.33 times the spot diameter, allowing electrons emitted from the second spot to refill the well at the normal location. The waveform produced at the pickup plate by scanning the partially refilled well with an electron beam is a large positive pulse as the well is reformed, followed by a smaller negative pulse as the beam is turned off. A portion of the signal waveform is selected, and an amplitude discriminator is provided to differentiate between the signals in which the selected portion is above a selected amplitude and those in which that portion is below that selected amplitude, thus sensing which binary digit is stored at the spot under consideration.

Several factors encountered in operation of cathode ray tubes may change the polarity and amplitude of the signals produced by the Williams-type memory system by an amount great enough to cause confusion between the two possible types of stored information. Impurities in the phosphor surface may prevent formation of the proper potential distribution; stray secondary electrons which result from repetitive consultations of nearby memory locations may refill information spots; tube operating potentials and deflection voltages may drift or may be in error by minute amounts; the focus may be non-uniform over the face of the tube; and ordinary amplifier noise and pickup of external electrical disturbances may distort the signals. The combined effects of the above factors may produce serious disturbances. The normally positive signals may be reduced in magnitude, while the normally negative signals may become positive, and of magnitude equal to or greater than the normally positive signals.

With a knowledge of the shortcomings of memory systems of prior art, applicant has as a primary object of his invention provision of a more reliable memory system for automatic computers and the like. A further object of his invention is to provide a novel method of and means for storing binary information in electrostatic storage media. Another object is to provide an accurate, reliable memory system utilizing a novel charge storage pattern and comprising a novel arrangement for storage of and access to information.

Other objects and advantages of the invention will be apparent from the following detailed description of a preferred embodiment thereof, when read in conjunction with the appended drawings, in which.

In accordance with the present invention the information stored is written in a square raster of double dots similar to the representation of binary "1" in the conventional double dot system. To signify binary "1" in the present system, the beam is turned on at the normal spot, turned off, then twitched left and turned on again, so that the "rewrite" spot is to the left of the normal spot, producing a charge distribution like the right waveform in Fig. 2. To signify binary "0," the beam is turned on at the normal spot, turned off, then twitched right and turned on again at the rewrite position, producing the charge distribution shown in the left waveform of Fig. 2. To extract information from the memory, both the normal and rewrite spots are inspected in turn, so that each inspection results in a pair of pulses at the pickup plate. Both of these pulses are utilized. The second pulse of the pair is normally very large and positive for binary "1" and much smaller or negative for binary "0." An amplitude comparison circuit receives the selected pulses and provides an output to turn on the cathode ray beam whenever the second pulse is more positive than the first. This comparison circuit replaces the amplitude discriminator of conventional systems.

With the present improved system, it has been experimentally determined that a large amount of refilling of the potential wells by secondary electrons can be tolerated before the spot potentials become indistinguishable. Drift in operating potentials, changes in amplifier gain and beam intensity, and errors in deflection voltages are more negligible with the present system, because those factors will affect both pulses in substantially the same magnitude and direction. High beam intensities may be used, producing large induced signals, so that amplifier noise will be comparatively small. Because of the tolerance of the above-listed disturbing factors and the reduction in the relative importance of amplifier noise, greatly improved operation of the memory results, at least in the presence of only moderate refilling by secondary electrons. Moreover, even the effect of that refilling is lessened in the improved system. The relative performance of the improved with the conventional systems with respect to the tolerance of repetitive consultations, as determined by experiment, shows an improvement of from two to forty times, with a median of ten; that is, ten times as many consultations of the stored information can be made in the improved system without error, on the average, as could be made in prior systems.

Figure 1:
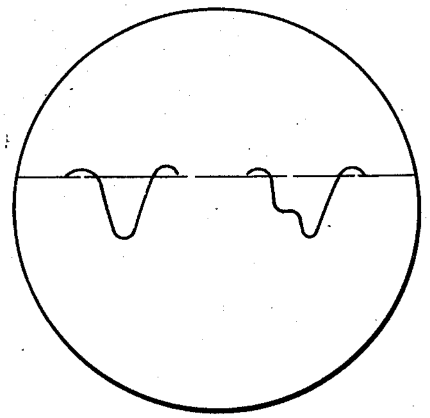
Figure 1 represents charge storage patterns representative of the two types of binary signals such as are utilized in storage systems of the prior art.
Figure 2:
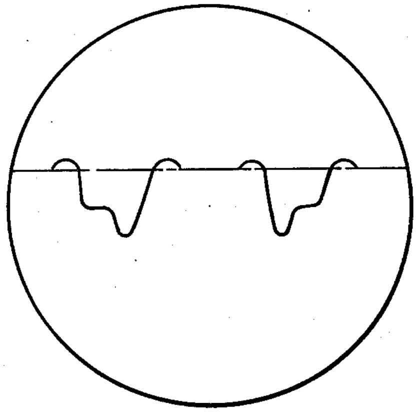
Figure 2 represents charge storage patterns illustrative of the two binary signals as utilized in the improved storage system.

As heretofore mentioned, the left waveform of Figure 2 illustrates the potential distribution formed by striking the normal spot first, then striking the rewrite spot just to the right of the normal spot (binary "0", while the right waveform of Figure 2 shows the potential distribution formed by striking the rewrite spot to the left of the normal spot (binary "1"). If in the binary "1" pattern the rewrite and normal spots are scanned in that order by the beam, the beam will strike the deep potential well, producing a negative pulse, then the partially refilled well, producing a positive pulse. If the binary "0" pattern above described is scanned from left to right, the partially refilled well is first scanned, producing a positive pulse, and the deep well is then scanned, producing a negative pulse. Therefore the stored information may be recognized by the relative location of the more positive pulse of the pair produced by scanning.

Figure 3:
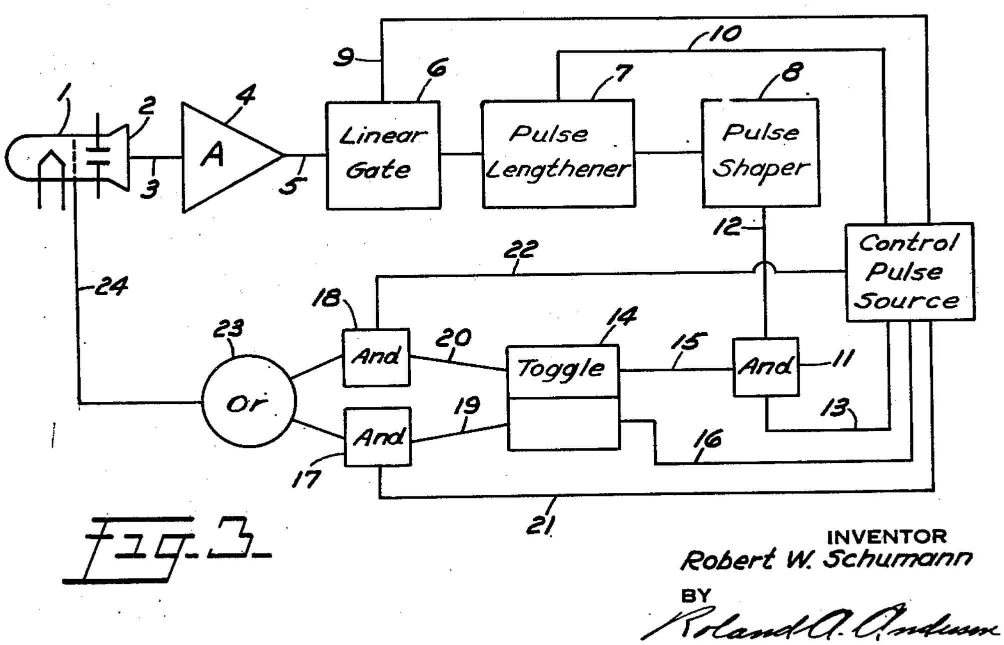
Figure 3 is a logical block diagram showing the method of and means for discriminating between the binary signals and regenerating the same for continuous storage.

Referring now to Fig. 3, a cathode ray storage tube 1 is provided with a pickup plate or foil 2 contacting the face of the glass envelope. A lead wire 3 connects the plate 2 to the input of a pulse amplifier 4. The amplified pulses on lead 5 are applied to a comparison circuit comprising a linear gate circuit 6, pulse lengthening circuit 7, and pulse shaper circuit 8. The linear gate, when opened by an appropriate signal on strobe lead 9, will allow a selected portion of an amplifier pulse to pass. The pulse width and position of the gating or strobe pulses are not critical, but may be selected to pass the peaks of the amplifier pulses. The gate should be linear over the entire range of anticipated amplifier pulses. The pulse lengthener sustains for a portion of one memory cycle the peak amplitude of the first pulse from the gate. When a second pulse arrives from the gate, if it is more positive than the first, the amplitude of the lengthener output will rise in a positive step signal. The pulse shaper includes a differentiating network having a short time constant to produce a sharp positive spike or pulse from the step in the lengthener output signal. Gate 11 is coupled to the shaping circuit 8 through lead 12 and also to the control pulse source through lead 13. The gate is of the logical "and" type, which will pass a pulse only upon receiving enabling signals at both inputs. Toggle 14 is a conventional bi-stable trigger circuit which is coupled to gate 11 through lead 15, and may be flipped from one stable state to the other by a pulse on lead 15. Lead 16 is coupled to the control pulse source to receive a "clear" pulse to reset the toggle to a predetermined state. Gates 17, 18 are logical "and" gates deriving their respective first inputs from opposite tubes of the toggle 14 on leads 19, 20, and respective second inputs from the control pulse source on leads 21, 22. The pulses impressed on the latter leads pass through the gates if they are enabled or opened by the voltages derived from the toggle 14. Gate 23 is a logical "or" gate which will pass a pulse from either gate 17 or gate 18. The output of gate 23 is coupled through lead 24 to the intensity grid of the cathode-ray tube 1.

Figure 4:
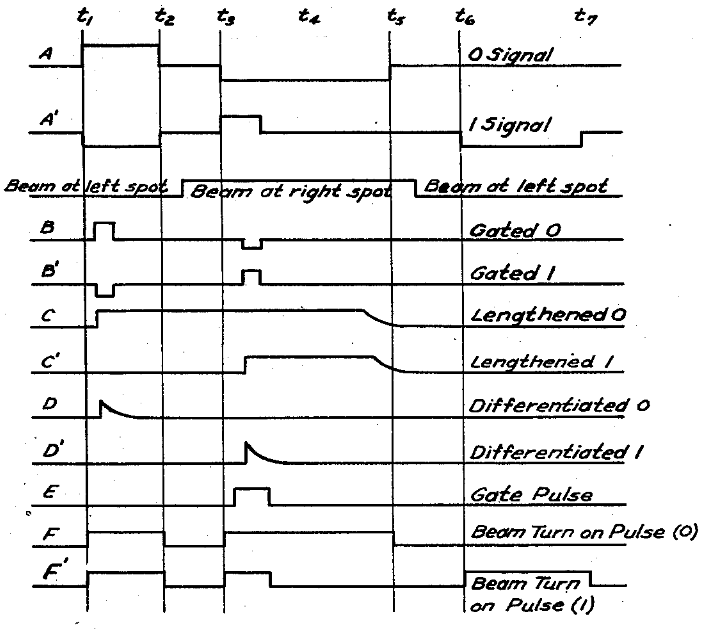
Figure 4 shows the time sequence of the control pulses which operate the improved memory circuit in proper order.

Referring now to Figures 3 and 4, operation of a typical stage of the improved memory system is as follows:

1. At the time $t_0$, just prior to time $t_1$ shown on Fig. 4, toggle 14 is cleared to a predetermined state by a negative pulse on lead 16, thus unblocking gate 17, but blocking gate 18.

2. At time $t_1$, the positive beam gating pulse from lead 21 passes through gates 17 and 23 and is applied to the intensity control grid on lead 24. It intensifies the beam of the cathode-ray tube until time $t_2$, when the pulse falls sharply, cutting off the beam.

3. At time $t_3$, the beam is intensified again, and potentially for a much longer time, depending on subsequent action of the circuit described below, by a second positive pulse on lead 21. Signals produced at the pickup plate 2 are amplified in amplifier 4 and passed to linear gate 6.

4. Two brief "strobe" pulses on lead 9 open gate 6 for two selected intervals just after $t_1$ and $t_3$ to select the desired peak portions of the signal from amplifier 4.

5. Lengthening circuit 7 sustains for a portion of one cycle the peak amplitude of the first pulse from gate 6, producing a steep wavefront or step at time $t_1$, followed by a very slowly decaying waveform. If the second pulse from gate 6 is more positive than the first, a second step will appear in the waveform of the output of the lengthener at the time $t_3$, corresponding to the inspection of the second spot by the beam gating pulse from lead 21.

6. The signal at the lengthener output is differentiated by shaper circuit 8, and the pulses corresponding to the time of the steps in the lengthener output are transmitted to gate 11 on lead 12.

7. If a step in the lengthener output occurred at time $t_3$, a sharp positive pulse or spike will appear on lead 12, and may be transmitted to toggle 14 by the arrival at gate 11 of a gating pulse on lead 13 coincident therewith.

8. When the state of toggle 14 is changed by such pulse, lead 19 changes voltage level, closing gate 17, removing the positive pulse from gate 23 and lead 24, and de-intensifying the cathode-ray beam. Then at time $t_6$, when the beam is again directed to the left-hand spot, the beam gating pulse on lead 22 will again be able to intensify the beam, this time through open gate 18 and gate 23.

9. If the toggle was not changed in state by the signals from leads 12, 13, then the beam is permitted to remain on during the interval in which the beam gating pulse on lead 21 is positive, but will not be re-intensified at the left-hand spot at time $t_6$, because gate 8 remains closed by the voltage on lead 20.

Thus the signals derived from the pair of spots determine whether or not the beam is re-intensified at the first spot at time $t_6$, thereby determining which of the two types of charge storage pattern will be regenerated or rewritten.

It will be recognized by those skilled in the art that the elements set forth in a preferred embodiment may take any of several conventional forms, and that functional equivalents for the components described may be substituted in the illustrated improved memory system without departing from the scope of my invention. For example, a delay line may be substituted for the pulse lengthener circuit to provide the necessary memory for comparison of the first and second pulses. It will be recognized that the scope of my invention is not to be construed as limited to the preferred embodiment herein described, but only by the appended claims.

What is claimed as novel is:

1. In an electrostatic memory system of the type including an information storage tube, means for establishing an electron beam therewithin, means for deflecting said beam about said tube to a raster of discrete points, a pick up plate contacting said tube to receive induced signals, and means for amplifying said induced signals, the improvement comprising means for storing binary information at any of said points, said storing means comprising means for establishing selected deflection voltages to position said beam at a selected point, means for momentarily intensifying said beam, means for producing a binary signal responsive to the binary information to be stored, means responsive to the character of said binary signal for establishing second deflection voltages to move said beam in one of two selected opposite directions from said point, and means for momentarily re-intensifying said beam; and means for reading and regenerating stored information, comprising means for re-establishing said selected deflection voltages, means for momentarily reintensifying said beam to produce a first output signal, means for re-establishing said second deflection voltages, means for momentarily re-intensifying said beam to produce a second output signal, gating means for selecting a portion of each of said output signals, means for deriving a control signal from that signal portion of greatest amplitude, means for re-establishing said selected deflection voltages; and means for reintensifying said beam responsive to the selectively timed occurrence of said control pulse.

2. In a cathode ray tube memory system, including means for establishing an electron beam in said tube and means for establishing deflection voltages to move said beam about to a raster of points on said tube, means for reading and regenerating binary information stored at said points comprising means for establishing selected first deflection voltages within said tube corresponding to a given point, means for momentarily intensifying said beam to produce a first output signal, means for establishing selected second deflection voltages within said tube, means for intensifying said beam to produce a second output signal, means dependent upon the relative sequence of the larger and smaller of said output signals for deriving a control signal of a selected polarity, means for re-establishing said first deflection voltages, and means responsive to a control signal of a selected polarity for re-intensifying said beam.

3. In an electrostatic memory system including a cathode ray storage tube, means for establishing an electron beam therewithin, means for deflecting said beam about said tube to a raster of related primary and secondary points, means for momentarily intensifying said beam, a pick-up plate contacting the face of said tube to receive induced signals from impingement of said intensified beam on the inner surface of said tube face, and an amplifier coupled to said plate, the improvement comprising a linear gating circuit coupled to said amplifier to receive output signals from said pick-up plate, means for enabling said circuit periodically to pass a portion of each signal, a pulse lengthener circuit for sustaining the crest of said signal portions coupled to said gating circuit, a differentiating network coupled to said lengthener, a coincidence gating circuit coupled to said network, means for periodically enabling said last-named circuit, a bistable toggle coupled to said coincidence gating circuit and adapted to be actuated thereby, a pair of gating circuits, each deriving an enabling signal from opposite stable states of said toggle and coupled to said beam energizing beam to control the same responsive to the state of said toggle.

References Cited in the file of this patent

UNITED STATES PATENTS

| | | |
|---|---|---|
| 2,589,460 | Tuller | Mar. 18, 1952 |
| 2,617,963 | Arditi | Nov. 11, 1952 |
| 2,629,827 | Eckert et al. | Feb. 24, 1953 |
| 2,647,161 | Schlesinger | July 28, 1953 |
| 2,649,555 | Lockhart | Aug. 18, 1953 |
| 2,700,151 | Flory | Jan. 18, 1955 |
| 2,709,230 | Williams et al. | May 24, 1955 |

OTHER REFERENCES

Proc. I. E. E., vol. 96, part 3, pp. 81–100, "A Storage System for Use With Binary-Digital Computating Machines," Williams, March 1949.

Proc. I. R. E., May 1950, vol. 38, No. 5, pp. 498–510, "A Dynamically Regenerated Electrostatic Memory System," Eckert et al.